United States Patent
Fimoff et al.

(10) Patent No.: US 7,110,447 B2
(45) Date of Patent: *Sep. 19, 2006

(54) CHANNEL ESTIMATOR FOR AN ADAPTIVE EQUALIZER

(75) Inventors: Mark Fimoff, Hoffman Estates, IL (US); Sreenivasa M. Nerayanuru, Wheeling, IL (US); Sedar Ozen, West Lafayette, IN (US)

(73) Assignee: Zenith Electronics Corporation, Lincolnshire, IL (US)

( * ) Notice: Subject to any disclaimer, the term of this patent is extended or adjusted under 35 U.S.C. 154(b) by 934 days.

This patent is subject to a terminal disclaimer.

(21) Appl. No.: 10/142,108

(22) Filed: May 9, 2002

(65) Prior Publication Data

US 2003/0210741 A1 Nov. 13, 2003

(51) Int. Cl.
*H03H 7/30* (2006.01)
*H04B 1/69* (2006.01)

(52) U.S. Cl. ............................. 375/232; 375/142

(58) Field of Classification Search ................ 375/232, 375/229, 230, 340, 346, 142
See application file for complete search history.

(56) References Cited

U.S. PATENT DOCUMENTS

| | | | | |
|---|---|---|---|---|
| 5,689,528 A | * | 11/1997 | Tsujimoto | ............... 375/233 |
| 5,970,092 A | | 10/1999 | Currivan | |
| 6,026,130 A | * | 2/2000 | Rahmatullah et al. | ...... 375/340 |
| 6,907,092 B1 | * | 6/2005 | Yakhnich et al. | ........... 375/346 |

FOREIGN PATENT DOCUMENTS

| | | |
|---|---|---|
| EP | 0 637 139 A1 | 2/1995 |
| WO | WO 99/49586 A2 | 9/1999 |
| WO | WO 99/49586 A3 | 9/1999 |

OTHER PUBLICATIONS

International Search Report, date of mailing Dec. 20, 2002.
R. W. Lucky, "Techniques for Adaptive Equalization of Digital Communication Systems", The Bell System Technical Journal, Feb. 1966, pp. 255-287.
R. W. Lucky, "Automatic Equalization for Digital Communication", The Bell System Technical Journal, Apr. 1965, pp. 547-589.
R. W. Lucky et al., "Principles of Data Communication",—Equalization of the Baseland System, pp. 128-165.
G. L. Stüber, "Principles of Mobile Communication",—Digital Signaling on ISI Channels, pp. 280-285.
ATSC—Digital Television Standard (Annex D), Sep. 16, 1995, pp. 46-60.

* cited by examiner

Primary Examiner—Khai Tran

(57) ABSTRACT

An impulse response of a channel is estimated by cross-correlating a known training signal with a received training signal to produce a cross-correlation vector. The cross-correlation vector is characterized by a known noise component resulting from the finiteness of the correlation. A correction vector is estimated based on the known training signal, where the correction vector is related to the noise component. Truncated representations of the correction vector are iteratively subtracted from the cross-correlation vector in order to produce a succession of cross-correlation outputs of increased accuracy. When the cross-correlation output is sufficiently accurate, it may be used to determine the weights to be given to the taps of an equalizer.

37 Claims, 3 Drawing Sheets

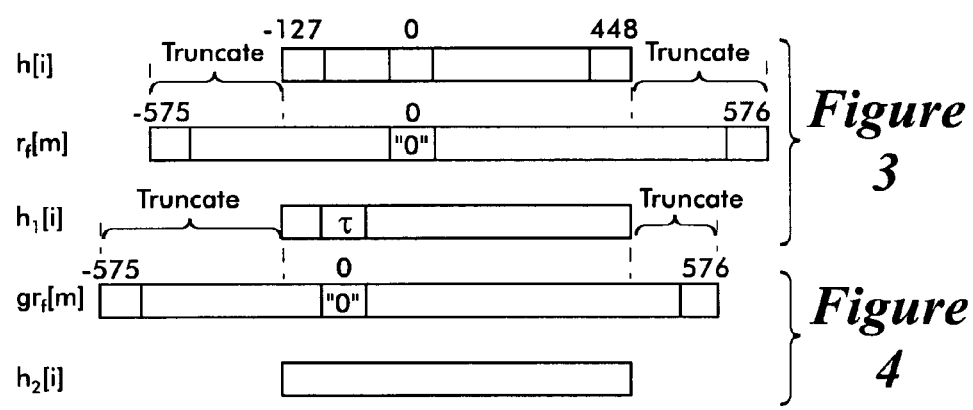
Figure 3
Figure 4
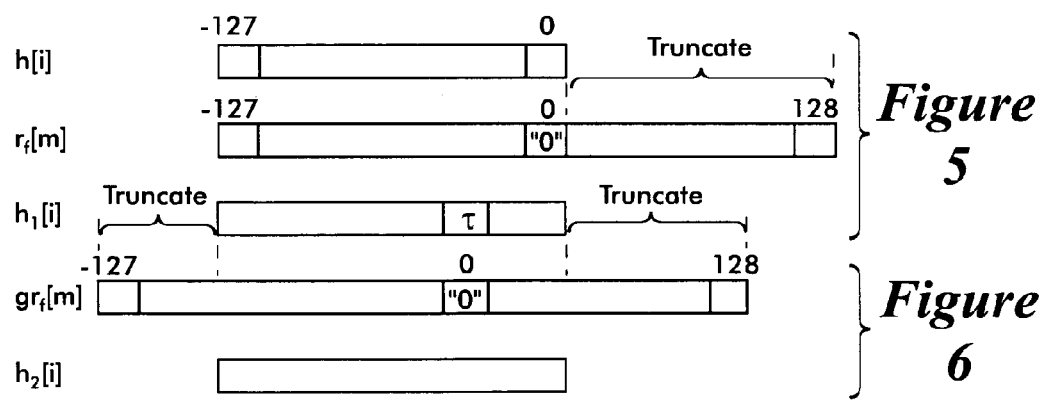
Figure 5
Figure 6

CHANNEL ESTIMATOR FOR AN ADAPTIVE EQUALIZER

RELATED APPLICATIONS

This application contains subject matter related to the subject matter disclosed in U.S. patent application Ser. No. 10/142,110 filed May 9, 2002.

TECHNICAL FIELD OF THE INVENTION

The present invention relates to equalizers and, more particularly, to equalizers that adapt to the condition of a channel through which signals are received.

BACKGROUND OF THE INVENTION

Linear adaptive equalizers having a plurality of taps are widely used in digital communication receivers in order to provide correction for multipath channel distortion. Adaptive algorithms, such as the least mean squares (LMS) algorithm, are implemented in order to determine the weight values for the taps of the equalizer. Such adaptive algorithms are easy to implement and provide reasonably good performance. However, under difficult channel conditions, these algorithms may fail to provide tap weights that converge to the desired values.

It is well known that this failure may be avoided if the tap weights, instead of being initialized to values of zero as is often done, are initialized at least somewhat close to their final desired values based on a knowledge of the channel impulse response (CIR). An estimate of the channel impulse response may be derived from an a priori known training signal periodically transmitted prior to, and/or along with, the unknown data. One such system with this feature is specified in the ATSC 8VSB standard for digital terrestrial television broadcasting.

The channel impulse response is typically estimated in a receiver by cross-correlating the training signal as received with a representation of the known transmitted training signal stored in the receiver. The Z-transform of the estimated channel impulse response is derived and inverted. From the inverted Z-transform, a vector is formed having a plurality of elements, and these elements are used to initialize a corresponding number of tap weights of the equalizer.

A conventional linear adaptive equalizer 10 that utilizes a transversal filter 12 is shown in FIG. 1. The transversal filter 12 comprises a plurality of taps $N_{ff}$ whose weights are applied to the received signal in order to eliminate the effects of multipath from the received signal. If it is assumed, for example, that the multipath communication channel is purely anti-causal (precursor response only), then the cursor position may be placed at the extreme right (last tap) of the transversal filter 12. The transversal filter 12 includes a plurality of outputs $14_1$ through $14_n$ and a corresponding plurality of multipliers $16_1$ through $16_n$. The signal on each of the outputs $14_1$ through $14_n$ is multiplied by a corresponding tap weight from a conventional tap weight update algorithm 18 (such as an LMS) by a corresponding one of the multipliers $16_1$ through $16_n$. The outputs from the multipliers $16_1$ through $16_n$ are added together by an adder 20, and the output from the adder 20 is supplied-as an output of the conventional linear adaptive equalizer 10. The output from the adder 20 is also supplied to a decision directed/blind module 22 that compares the filter output with either the known training signal, when the known training signal is being received, or likely corrected data decisions when the unknown data instead of the known training signal are being received. This comparison forms an error signal e that is used by the conventional tap weight update algorithm 18 to update the linear tap weights so as to minimize the value of the error e.

During training, and as described above, the conventional tap weight update algorithm 18 typically estimates the channel impulse response by a-periodically cross-correlating the training signal as received with a stored version of the known training signal. If s[k] is defined as the stored known training sequence for $k=0 \ldots (L-1)$, and if u[k] is defined as received data sampled at the symbol rate, with u[o] being the first received training symbol in the received signal, the cross-correlation is given by the following equation:

$$h[i] = \sum_{k=0}^{L-1} s[k]u[k+i], \quad \text{for} -N_a \leq i \leq N_c \tag{1}$$

where $N_c$ is the length of the causal response of the channel (post ghosts), and $N_a$ is the length of the anti-causal channel response (pre-ghosts).

The conventional tap weight update algorithm 18 then determines the Z-transform of h[i] and inverts the Z-transform in order to determine the tap weights that are supplied to the multipliers $16_1$ through $16_n$.

The present invention provides a novel technique for forming a more accurate estimate of the channel impulse response h[i]. Alternatively and/or additionally, the present invention provides a novel technique for determining the inverse of the Z-transform of the estimated channel impulse response h[i].

SUMMARY OF THE INVENTION

In accordance with one aspect of the present invention, a method for estimating the impulse response of a channel comprises the following: a-periodically cross-correlating a known training signal with a received training signal to produce a cross-correlation vector, the cross-correlation vector being characterized by a noise component resulting from the finiteness of the a—periodic correlation; estimating a correction vector based on the known training signal, the correction vector being related to the noise component; and, iteratively subtracting truncated representations of the correction vector from the cross-correlation vector to produce a succession of cross-correlation outputs of increased accuracy.

In accordance with another aspect of the present invention, a method for estimating the impulse response of a channel comprises the following: cross-correlating a transmitted signal with a received signal to produce a correlation vector representing a correlation between the transmitted signal and the received signal, the correlation vector being characterized by a known noise component resulting from the finiteness of the correlation; and, subtracting the known noise component from the correlation vector.

In accordance with still another aspect of the present invention, a method for estimating the impulse response of a channel comprises the following: cross-correlating received data with a representation of the data as they should have been received so as to produce a correlation vector, wherein the correlation vector is characterized by a known noise component resulting from the finiteness of the correlation; and, subtracting the known noise component from the correlation vector.

BRIEF DESCRIPTION OF THE DRAWINGS

These and other features and advantages will become more apparent from a detailed consideration of the invention when taken in conjunction with the drawings in which:

FIGS. 3 and 4 illustrate steps according to a first example in correcting a cross-correlation of a known training signal with a received training signal in order to remove noise caused by the finiteness of the correlation in order to compute an accurate channel impulse response estimate;

FIGS. 5 and 6 illustrate steps according to a second example in correcting a cross-correlation of a known training signal with a received training signal in order to remove noise caused by the finiteness of the correlation in order to compute an accurate channel impulse response estimate;

DETAILED DESCRIPTION

Equation (1) results in a cross-correlation vector $h[i]$ having $N=N_a+N_c+1$ elements. The inventors have recognized that, due to the finiteness of the correlation operation as represented by equation (1), the cross-correlation vector $h[i]$ is characterized by an a prior known first noise component in the main path and in each reflected path in proportion to the relative gain in each respective path, a second noise component due to the additive white Gaussian noise (AWGN), and a third noise component due to neighboring unknown symbols. Regarding the first noise component, the a-periodic autocorrelation of a binary valued ($\{+A, -A\}$) PN sequence of length L ($PN_L$) is given by the following equation:

$$rPN_L(m) = LA^2, \quad \text{if } m = 0, \pm L, \pm 2L, \ldots \quad (2)$$
$$= -A^2, \quad \text{otherwise}$$

However, if the PN sequence is finite and the standard linear correlation is used, then the autocorrelation values corresponding to the non-zero lags will not be constant and will not be as low as $-A^2$. As an illustration, consider the following sequence composed of six $PN_{511}$ appended back-to-back:

$$y=[PN_{511}, PN_{511}, PN_{511}, PN_{511}, PN_{511}, PN_{511}] \quad (3)$$

Figure 2:
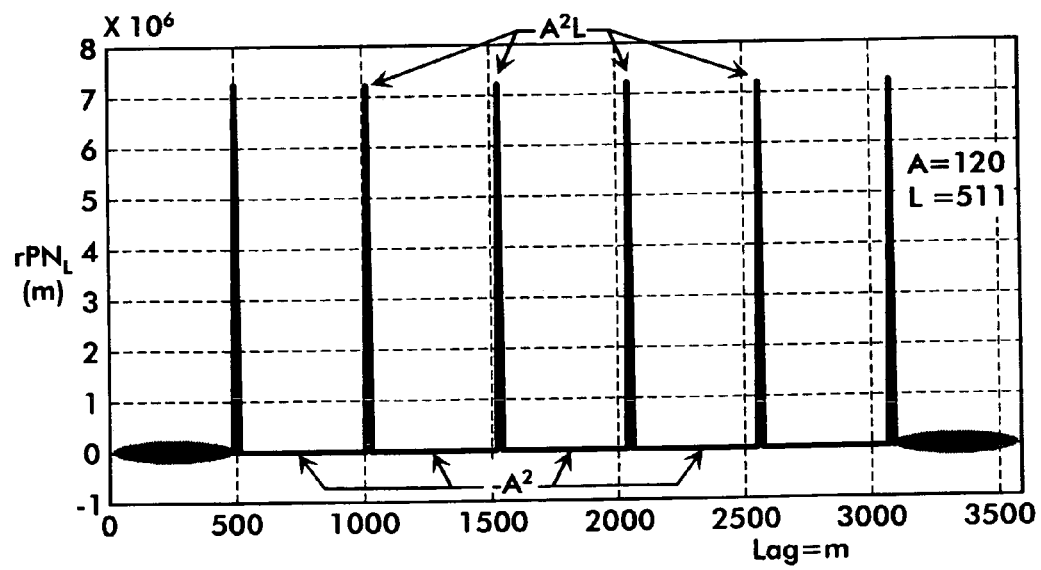
FIG. 2 illustrates the cross-correlation of two finite PN sequences.

The cross-correlation $r_{xy}[m]$ of x and y where $x=[PN_{511}]$ is shown in FIG. 2. It will be noted that a low correlation value of $-A^2$ is obtained for lags that are not multiples of L=511 corresponding to the intermediate $PN_{511}$ portions of the long sequence y. However, this constant and low correlation value will not be achieved for the outermost lags, which will instead have a "noise" like correlation due to the finiteness of the sequence.

The training sequence used as part of the ATSC 8VSB digital television broadcast standard is actually given by the following equation:

$$\tilde{s}=[PN511, PN63, PN63, PN63] \quad (4)$$

As explained above, the correlation of this sequence with the received signal will be "noisy" because the sequences are finite in length and will not achieve their low correlation value for non-zero lag. The inventors have recognized that the channel impulse response may be more accurately estimated by compensating for this "noise" component.

In general, this compensation is accomplished by deriving a representation of the "noise" component and by iteratively subtracting it from the main and each dominant reflected path detected in the initial channel impulse response estimate.

Let S be a vector representation of the elements of the known (i.e., as transmitted) training sequence s[k], for k=0 . . . (L−1). Also, let q[k] represent the elements of a vector [Z, S, Z] of length L+2 (N−1), where the training sequence has a length L, where Z is a zero vector of length (N−1), and where q[0] coincides with s[0].

A correction vector $\tilde{r}_f[m]$ representing the noise component due to the finiteness of the correlation may be derived according to the following equation:

$$r_f[m] = \sum_{k=0}^{L-1} s[k]q[k+m], \quad \text{for} -(N-1) \le m \le N \quad (5)$$

Equation (5) is modified by setting the main path element of $r_f[m]=0$ in order to derive the final correction vector $\tilde{r}_f[m]$ according to the following equation:

$$r_f[m] = \frac{r_f[m]}{r_f[0]}, \quad \text{for} -(N-1) \le m \le N, m \ne 0 \quad (6)$$
$$= 0, \quad \text{for } m = 0$$

where the elements of $r_f[m]$ have been normalized to the main path element $r_f[0]$.

The channel estimate h[i] may now be corrected in a series of steps. In the first step, main path correction is achieved by subtracting $\tilde{r}_f[m]$ from h[i] with the zero elements of the respective vectors in alignment and with $\tilde{r}_f[m]$ truncated to $-N_a \le m \le N_c$. This operation results in a first correction of vector h[i], with no modification of the main path element h[0] because $\tilde{r}_f[0]=0$.

The foregoing subtraction operation is repeated in turn for each dominant reflected path to further refine h[i]. Thus, the next largest data element of h[i] is located at h[τ] and is assumed to have a level gh[0], where |g|<1. If |g| is greater than a predetermined threshold value, the foregoing vector subtraction is repeated with h[τ] in alignment with $\tilde{r}_f[0]$ and with $\tilde{r}_f[m]$ truncated to $-(N_a-\tau) \le m \le (N_c-\tau)$. This operation, thus, results in yet a further refinement in the accuracy of correlation vector h[i]. This process is repeated in subsequent steps until there are no longer any elements of h[i] satisfying the threshold condition. The final corrected channel estimate is referred to as h'[i].

As an example of the foregoing, a linear equalizer for an ATSC transmission with $N_a$ set to 127 and $N_c$ set to 448 may be assumed. Therefore, N is equal to 576 according to this assumption. It may further be assumed that the training signal S has 515 elements (L=515) consisting of 4 segment sync symbols and a 511 symbol pseudorandom number sequence (PN511). As indicated above, the vector used to derive r̃[m] is defined as [Z, S, Z]. This definition is used in the general case. In the case where the signals of interest are VSB signals such as those used in digital television, the vector used to derive r̃$_f$[m] is defined as [Z, S, W], where W may be assumed to consist of three 63 symbol pseudorandom number sequences (3PN63), 24 mode symbols, and 362 zeros. Vector Z is a zero vector having N−1=575 elements. Accordingly, the length of vector q is 575+515+575=1665.

In this example, $r_f[m]$ is given by the following equation:

$$r_f[m] = \sum_{k=0}^{514} s[k]q[k+m], \quad \text{for} -575 \leq m \leq 576 \tag{7}$$

and h[i] is initially given by the following equation:

$$h[i] = \sum_{k=0}^{514} s[k]u[k+i], \quad \text{for} -127 \leq i \leq 448 \tag{8}$$

The first and second subtraction iterations for this example are illustrated in FIGS. 3 and 4, respectively. Accordingly, as shown in FIG. 3, a main path correction is achieved by subtracting r̃$_f$[m] from h[i] with the zero elements of the respective vectors in alignment and with r̃$_f$[m] truncated to −127≦m≦448. This operation results in a first correction of vector h[i], with no modification of the main path element h[0] because r̃$_f$[0]=0. This corrected vector is designated $h_1[i]$.

As shown in FIG. 4, the foregoing subtraction operation is repeated by aligning the dominant element of the vector $h_1[i]$ with the zero element of the vector r̃$_f$[m]. The largest data element of $h_1[i]$ is located at h [τ] and is assumed to have a level gh[0], where |g|<1. As long as |g| is greater than a predetermined threshold value, the foregoing vector subtraction is made with h[τ] in alignment with r̃$_f$[0] and with r̃[m] truncated to −(127−τ)≦m≦(448−τ) This operation, thus, results in yet a further refinement in the accuracy of correlation vector h[i]. This further refined channel estimate is designated $h_2[i]$.

This process is repeated in subsequent steps until there are no longer any elements of the vector h[i] that satisfy the threshold condition. The final corrected channel estimate is designated h'[i].

As another example, the foregoing conditions may be assumed except that the channel is a purely anti-causal channel such that $N_c=0$. In this case, $N=N_a+1=128$ and $r_f[m]$ and h[i] are given by the following equations:

$$r_f[m] = \sum_{k=0}^{514} s[k]q[k+m], \quad \text{for} -127 \leq m \leq 128 \tag{9}$$

$$h[i] = \sum_{k=0}^{514} s[k]u[k+i], \quad \text{for} -127 \leq i \leq 0 \tag{10}$$

The first and second subtraction iterations for this example are shown in FIGS. 5 and 6, respectively. Accordingly, as shown in FIG. 5, a main path correction is achieved by subtracting r̃$_f$[m] from h[i] with the zero elements of the respective vectors in alignment and with r̃$_f$[m] truncated to −127≦m≦0. This operation results in a first correction of vector h[i], with no modification of the main path element h[0] because r̃$_f$[0]=0. This corrected vector is designated $h_1[i]$.

As shown in FIG. 6, the foregoing subtraction operation is repeated by aligning the dominant element of the vector $h_1[i]$ with the zero element of the vector r̃$_f$[m]. The largest data element of $h_1[i]$ is located at h[τ] and is assumed to have a level gh[0], where |g|<1. As long as |g| is greater than a predetermined threshold value, the foregoing vector subtraction is made with h[τ] in alignment with r̃$_f$[0] and with r̃$_f$[m] truncated to −(127−τ)≦m≦(0−τ). This operation, thus, results in yet a further refinement in the accuracy of correlation vector h[i]. This further refined channel estimate is designated $h_2[i]$.

This process is repeated in subsequent steps until there are no longer any elements of the vector h[i] that satisfy the threshold condition. The final corrected channel estimate is designated h'[i].

The vector h'[i] represents the channel impulse response corrected for the "noise" component caused by the finiteness of the correlation process. The Z transform of this vector may be determined and inverted in order to determine the tap weights for the initialization of the taps of the equalizer.

Figure 7:
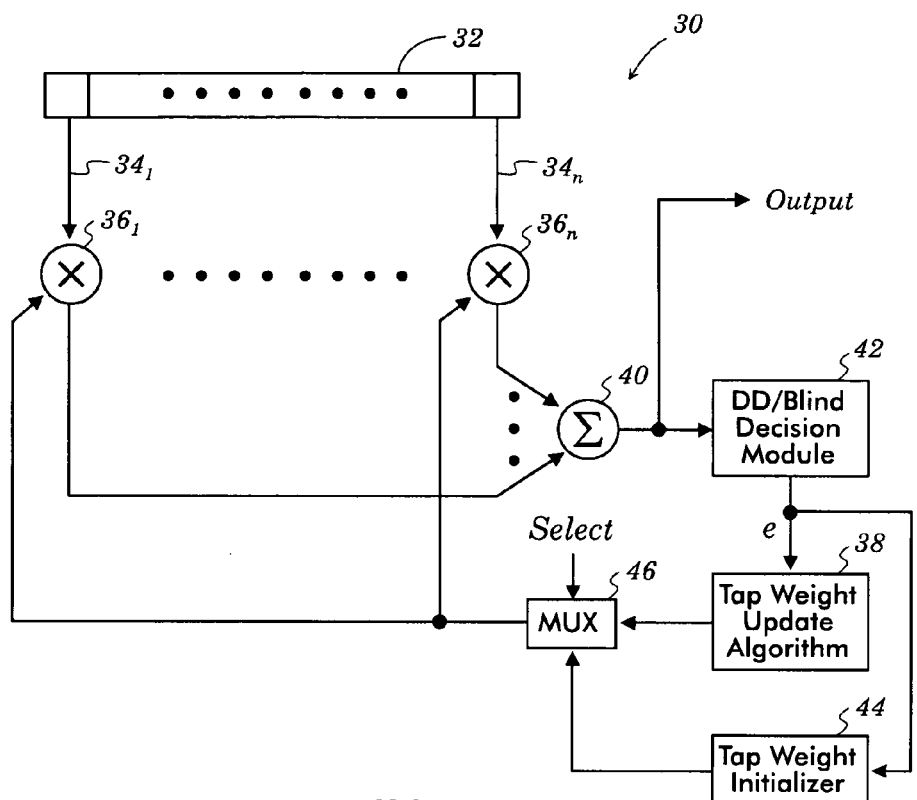
FIG. 7 illustrates a linear adaptive equalizer whose tap weights may be adjusted in accordance with an embodiment of the present invention; and, FIG. 8 illustrates a tap weight initializer adjuster that can be used to initialize the tap weights of the linear adaptive equalizer illustrated in FIG. 3.

A linear adaptive equalizer 30 as shown in FIG. 7 may implement this procedure of reducing the correlation "noise" in the channel impulse response. The linear adaptive equalizer 30 utilizes a transversal filter 32 having a plurality of outputs $34_1$ through $34_n$ and a corresponding plurality of multipliers $36_1$ through $36_n$. The signal on each of the outputs $34_1$ through $34_n$ is multiplied by a corresponding tap weight from a conventional tap weight update algorithm 38 (such as an LMS) by a corresponding one of the multipliers $36_1$ through $36_n$. The outputs from the multipliers $36_1$ through $36_n$ are added together by an adder 40, and the output from the adder 40 is supplied as an output of the linear adaptive equalizer 30. The output from the adder 40 is also supplied to a decision directed/blind module 42 that compares the filter output with either the known training signal, when the known training signal is being received, or likely corrected data decisions when the unknown data instead of the known training signal are being received. This comparison forms an error signal e.

Figure 1:
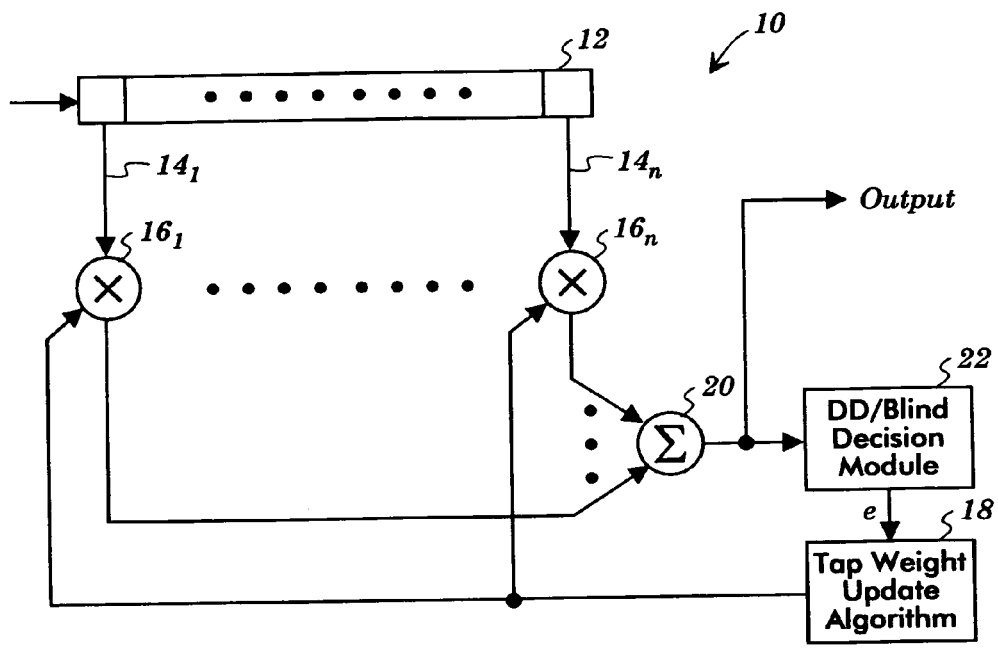
FIG. 1 illustrates a conventional linear adaptive equalizer whose tap weights may be adjusted as described above.

As described up to this point, the linear adaptive equalizer 30 is the same as the conventional linear adaptive equalizer 10 shown in FIG. 1. However, unlike the conventional linear adaptive equalizer 10 shown in FIG. 1, the error signal e is used by a tap weight initializer 44 to initialize the tap weights applied by the multipliers $36_1$ through $36_n$. The tap weight initializer 44 implements the procedure described above in relation to equations (5) and (6) and FIGS. 3–6. For example, in the case where the present invention is used in a digital television application, the tap weight initializer 44 uses the error signal e to initialize the tap weights applied by the multipliers $36_1$ through $36_n$ during a brief period of time following a channel change. During this brief period of time, a multiplexer 46 selects the tap weight initializer 44 in order to apply the tap weights from the tap weight initializer 44 to the multipliers $36_1$ through $36_n$. Otherwise, the multiplexer 46 selects the conventional tap weight update algorithm 38 in order to apply the tap weights from the conventional tap weight update algorithm 38 to the multipliers $36_1$ through $36_n$.

It should be noted that equation (5) does not depend on any received signal and instead relies only on the known training signal s[k] and the vector [Z, S, W]. Because both of these vectors are known a priori, the correction vector $r_f[m]$ may be programmed into the tap weight initializer 44 in the factory.

The inventors have developed a novel technique for forming the inverse of the Z transform of a channel impulse response vector h[i] for an anti-causal channel. Although this technique is described herein for the corrected vector h'[i], it should be recognized that this technique also may be used for uncorrected channel impulse response vectors.

For the case of a purely anti-causal (precursor only) multi-path channel, the corrected channel impulse response estimate produced by the previously described technique is h'[i]. The Z-transform of h'[i] is the channel transfer function and is given by the following equation:

$$H'[z] = \sum_{k=-N}^{0} h[k] z^{-k} \quad (11)$$

If it is assumed that a level thresholding algorithm is used after the correlation in order to set the elements of h'(i) below a given threshold to zero, equation (11) can be written as a finite sequence according to the following equation:

$$H'[z] = \alpha_0 \beta'_m z^{Dm} + \ldots + \alpha_0 \beta'_2 z^{D2} + \alpha_0 \beta'_1 z^{D1} + \alpha_0 \quad (12)$$
$$= \alpha_0 (\beta'_m z^{Dm} + \ldots + \beta'_2 z^{D2} + \beta'_1 z^{D1} + 1)$$

Equation (12) indicates that there are m paths exceeding the level thresholding criteria each with a respective delay $D_m$.

The inverse of the Z-transform as given by equation (11) traditionally yields the desired initial tap weights of a zero forcing equalizer having N taps. As will be shown below, this inverse of H'[z], denoted as $H_i'[z]$, has an infinite number of terms and, therefore, cannot be used directly. However, the terms in this infinite number of terms are usually truncated to provide a realizable solution.

More specifically, it is known that the inverse of H'[z] as given in equation (11) can be expressed as an infinite summation according to the following equation:

$$H_i'[z] = \frac{1}{H'[z]} = \frac{1}{\alpha_0} \sum_{k=0}^{\infty} (-1)^k (\gamma^k(z)) \quad (13)$$

where $$\gamma(z) = \beta_m z^{Dm} + \ldots + \beta_2 z^{D2} + \beta_1 z^{D1}$$

whenever $$\sum_{i=1}^{m} \beta_m < 1$$

Since equation (13) is an infinite series, it has no practical realization and, therefore, must be truncated before it can be implemented. The simple approach for truncating equation (13) is to drop all terms of the summation exceeding $\lfloor N/D_a^m \rfloor$, where $\lfloor \; \rfloor$ denotes rounding to the largest integer smaller than $N/D_a^m$. This approach results in a finite summation sequence that provides an estimate of $H_i'[z]$ and that may be referred to as $H_{ff}$. The finite summation sequence $H_{ff}$ is given by the following equation:

$$H_{ff} = \frac{1}{\alpha_0} \sum_{k=0}^{N'} (-1)^k \gamma^k(z) \quad (14)$$

where $$N' = \lfloor N/D_m \rfloor$$

As an example, it is assumed that there are two dominant multipaths. Thus, m=2. It may further be assumed that the first multipath has a delay $D_1=19$, that the second multipath has a delay $D_2=30$, and that the equalizer has 99 taps. Therefore, in this example, N'=99/30=3. Using equation (14), $H_{ff}$ is given by the following equation:

$$H_{ff}[z] = \sum_{k=o}^{3} (-1)^k (\beta_1 z^{19} + \beta_2 z^{30})^k \quad (15)$$
$$= 1 - (\beta_1 z^{19} + \beta_2 z^{30}) + (\beta_1^2 z^{38} + 2\beta_1 \beta_2 z^{49} + \beta_2^2 z^{60}) -$$
$$(\beta_1^3 z^{57} + 3\beta_1^2 \beta_2 z^{68} + 3\beta_1 \beta_2^2 z^{79} + \beta_2^3 z^{90})$$

The tap weight values from equation (15) are shown in Table 1 below.

TABLE 1

| Tap Number | Tap Weight |
|---|---|
| 19 | $\beta_1$ |
| 30 | $\beta_2$ |
| 38 | $\beta_1^2$ |
| 49 | $2\beta_1\beta_2$ |
| 57 | $\beta_1^3$ |
| 60 | $\beta_2^2$ |
| 68 | $3\beta_1^2\beta_2$ |
| 79 | $3\beta_1\beta_2^2$ |
| 90 | $\beta_2^3$ |

Table 1 does not provide for the best initialization of the equalizer because the truncation of equation (13) given by equation (15) does not include all the available tap weights within the span of the equalizer.

Thus, while the above described truncation of $H_i'[z]$ is straightforward, it does not provide the most accurate solution because it does not provide all of the tap weight values necessary to achieve optimum equalizer initialization. A better solution, for example, might be realized if $H_{ff}$ is calculated assuming N (the number of equalizer taps) to be larger than the actual number of equalizer taps, and then truncating the solution by dropping all tap weight values for taps greater than the actual number of tap values. This approach typically results in additional tap values as compared to those that would be produced using equation (14), and these additional tap weights provide a better solution.

However, it is difficult to predict how large the assumed value of N needs to be before it is assured that all relevant tap weight values necessary to achieve optimum initialization will be included in the solution.

The novel technique described herein for forming the inverse of a channel impulse response vector h[i] for an anti-causal channel avoids this uncertainty by providing a technique for calculating $H_{ff}$ such that the calculation includes all relevant tap weight values (i.e., all tap weight values less than the length of the physical equalizer) necessary to achieve optimum initialization. The algorithm of this novel technique simultaneously inverts and truncates H'(z) to provide an optimum inverse given the constraints of the equalizer being implemented (in particular, the number of taps available in the equalizer).

This novel technique was invented by the inventors as a result of their discovery that all necessary tap weight values to achieve optimum initialization are produced using a nested summation approach. In the case of only two dominant multi-paths, the following nested summation equation is used:

$$H_{ff} = \frac{1}{\alpha_0} \sum_{k=0}^{k_{max}} \sum_{j=o}^{j_{max}(k)} \binom{k}{j} (-1)^k \left( \beta_1^{k-j} \beta_2^j z^{D_{k,j}} \right) \quad (16)$$

where $$D_{k,j} = (k-j)D_1 + jD_2 = kD_1 + j(D_2 - D_1)$$

$$k_{max} = \left\lfloor \frac{N}{D_1} \right\rfloor$$

$$j_{max}(k) = \left\lfloor \frac{N - kD_1}{D_2 - D_1} \right\rfloor$$

For the exemplary values given above, $D_{k,j}$=19 k+11j, $k_{max}$=5, and $j_{max}(k)$=(99 −19 k)/11. Using these values in equation (16) produces the following equation:

$$H_{ff} = \sum_{k=0}^{5} \sum_{j=o}^{9-2k} \binom{k}{j} (-1)^k \left( \beta_1^{k-j} \beta_2^j z^{19k+11j} \right) \quad (17)$$

Expanding equation (17) results in:

$$H_{ff} = 1 - (\beta_1 z^{19} + \beta_2 z^{30}) + (\beta_1^2 z^{38} + 2\beta_1\beta_2 z^{49} + \beta_2^2 z^{60}) - \quad (18)$$
$$(\beta_1^3 z^{57} + 3\beta_1^2\beta_2 z^{68} + 3\beta_1\beta_2^2 z^{79} + \beta_2^3 z^{90}) +$$
$$(\beta_1^4 z^{76} + 4\beta_1^3\beta_2 z^{87} + 6\beta_1^2\beta_2^2 z^{98} + \beta_1^5 z^{95})$$

The optimum solution given by equation (18) is illustrated in Table 2, which includes four tap weight values (for taps 76, 87, 95 and 98) not included in Table 1.

TABLE 2

| Tap Number | Tap Weight |
|---|---|
| 19 | $\beta_1$ |
| 30 | $\beta_2$ |
| 38 | $\beta_1^2$ |
| 49 | $2\beta_1\beta_2$ |
| 57 | $\beta_1^3$ |
| 60 | $\beta_2^2$ |
| 68 | $3\beta_1^2\beta_2$ |
| 76 | $\beta_1^4$ |
| 79 | $3\beta_1\beta_2^2$ |
| 87 | $4\beta_1^3\beta_2$ |
| 90 | $\beta_2^3$ |
| 95 | $\beta_1^5$ |
| 98 | $6\beta_1^2\beta_2^2$ |

It will be observed that equation (16) includes two nested summations because there are assumed to be only two dominant multipaths characterizing the Z-transform of the channel impulse response.

Equation (16) can be generalized according to the following equation in order to include m nested summations for the case of m multipaths:

$$H_{ff}(z) = \quad (19)$$

$$\frac{1}{\alpha_0} \sum_{k_1=0}^{k_{1,max}} \sum_{k_2=0}^{k_{2,max}(k_1)} \cdots \sum_{k_{M-1}=0}^{k_{M-1,max}(k_1, k_2, \cdots, k_{M-2})} \sum_{k_M=0}^{k_{M,max}(k_1, k_2, \cdots, k_{M-1})} [\Gamma]$$

where $$\Gamma = \left[ \binom{k_1}{k_2}\binom{k_2}{k_3} \cdots \binom{k_{M-1}}{k_M} (-1)^{k_1} \right.$$
$$\left. \left( \beta_1^{k_1-k_2} \beta_2^{k_2-k_1} \cdots \beta_{M-1}^{k_{M-1}-k_M} \beta_M^{k_M} z^{D(k_1, \cdots, k_M)} \right) \right]$$

$$\Gamma = \frac{k_1! (-1)^{k_1} \beta_1^{k_1-k_2} \beta_2^{k_2-k_3} \cdots \beta_{M-1}^{k_{M-1}-k_M} \beta_M^{k_M} z^{D(k_1, \cdots, k_M)}}{k_M! \prod_{l=1}^{M-1}((k_l - k_{l+1})!)}$$

and where $$D(k_1, \cdots, k_M) = (k_1 - k_2)D_1^a + (k_2 - k_3)D_2^a + \cdots +$$
$$(k_{M-1} - k_M)D_{M-1}^a + k_M D_M^a$$
$$= k_1 D_1^a + (D_2^a - D_1^a)k_2 + \cdots + (D_M^a - D_{M-1}^a)k_M$$

$$k_{1,max} = \left\lfloor \frac{N_{ff}}{D_1^a} \right\rfloor$$

$$k_{n,max}(k_1, \cdots, k_{n-1}) = \left\lfloor \frac{N_{ff} - k_1 D_1^a - \sum_{l=2}^{n-1}(D_l^a - D_{l-1}^a)k_l}{D_n^a - D_{n-1}^a} \right\rfloor,$$

for $2 \le n \le M$

The outermost summation of these m nested summations is performed over limits between 0 and the number of equalizer taps N divided by the shortest delay D characterizing the dominant multi-paths. In the example above where m is 2, $D_1$ is 19, and $D_2$ is 30, the shortest delay is 19.

Figure 8:
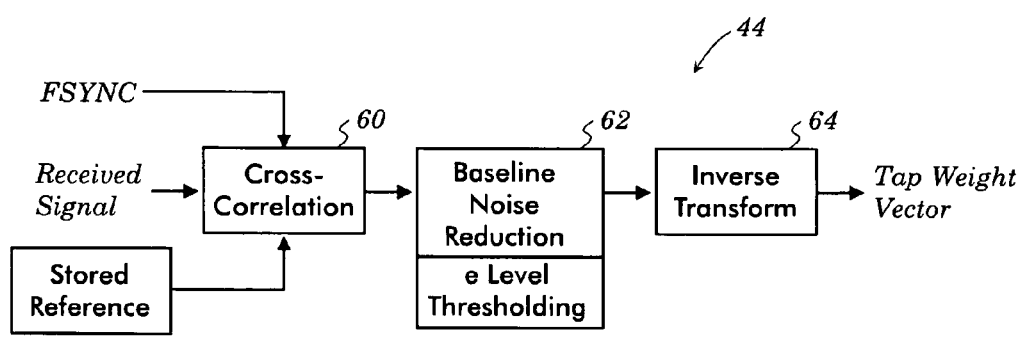

As shown in FIG. 8, the tap weight initializer 44 for both of the novel techniques described above includes a cross-correlator 60 that cross correlates the received symbols u[k]

with the stored training signal s[k] in accordance with equation (1). The operation of the cross correlator 60 is synchronized, for example, to the frame synchronization signal that is derived from a frame transmitted in accordance with the digital terrestrial television broadcasting standard. The cross correlation h[i] represents the error between the received symbols u[k] with the stored known training signal s[k].

A block 62 stores the "noise" caused by the finiteness of the cross correlation in accordance with equations (5) and (8) and iteratively subtracts this "noise" from the cross correlation as discussed above to produce the corrected cross correlation h'[i]. A block 64 determines the inverted Z transform of h'[i] in accordance with equations (11) and (16) (if m=2) or in accordance with equations (11) and (19) (in the general case) in order to determine the initial tap weights to be applied to the taps of the multipliers $36_1$ through $36_n$ of FIG. 7. Accordingly, the block 64 can be programmed in accordance with these equations by one skilled in the art.

Modifications of the present invention will occur to those practicing in the art of the present invention. For example, the present invention as described above relies on the use of a training signal. However, other signals, such as data signals, can be used to implement the present invention.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method for estimating the impulse response of a channel comprising:
   a-periodically cross-correlating a known training signal with a received training signal to produce a cross-correlation vector, the cross-correlation vector being characterized by a noise component resulting from the finiteness of the correlation;
   estimating a correction vector based on the known training signal, the correction vector being related to the noise component; and,
   iteratively subtracting truncated representations of the correction vector from the cross-correlation vector to produce a succession of cross-correlation outputs of increased accuracy.

2. The method of claim 1 wherein the correction vector is estimated by setting the middle data element thereof to a substantially zero value.

3. The method of claim 2 wherein the first subtraction is performed with the zero data element of the cross-correlation vector and the middle data element of the correction vector in alignment.

4. The method of claim 3 wherein the subsequent subtractions are performed only so long as the next largest data element of the correlation vector exceeds a threshold value.

5. The method of claim 3 wherein each subsequent subtraction is performed with the next largest data element of the correlation vector in alignment with the middle data element of the correction vector.

6. The method of claim 5 wherein the subsequent subtractions are performed only so long as the next largest data element of the correlation vector exceeds a threshold value.

7. The method of claim 1 wherein the cross-correlation vector includes a causal portion and an anti-causal portion.

8. The method of claim 1 wherein the cross-correlation vector only includes an anti-causal portion.

9. The method of claim 1 wherein the first subtraction is performed with the main data element of the cross-correlation vector and the middle data element of the correction vector in alignment.

10. The method of claim 9 wherein the subsequent subtractions are performed only so long as the next largest data element of the correlation vector exceeds a threshold value.

11. The method of claim 9 wherein each subsequent subtraction is performed with the next largest data element of the correlation vector in alignment with the middle data element of the correction vector.

12. The method of claim 11 wherein the subsequent subtractions are performed only so long as the next largest data element of the correlation vector exceeds a threshold value.

13. A method for estimating the impulse response of a channel comprising:
    a-periodically cross-correlating a transmitted signal with a received signal to produce a correlation vector representing a correlation between the transmitted signal and the received signal, the correlation vector being characterized by a known noise component resulting from the finiteness of the correlation; and,
    subtracting the known noise component from the correlation vector.

14. The method of claim 13 wherein the known noise component has a middle data element set to a substantially zero value.

15. The method of claim 14 wherein the known noise component is subtracted from the correlation vector with the zero data element of the correlation vector and the middle data element of the known noise component in alignment.

16. The method of claim 15 wherein a subsequent subtraction of the known noise component from the correlation vector is performed only if the next largest data element of the correlation vector exceeds a threshold value.

17. The method of claim 15 wherein a subsequent subtraction of the known noise component from the correlation vector is performed with the next largest data element of the correlation vector in alignment with the middle data element of the known noise component.

18. The method of claim 17 wherein the subsequent subtraction of the known noise component from the correlation vector is performed only if the next largest data element of the correlation vector exceeds a threshold value.

19. The method of claim 13 wherein the correlation vector includes a causal portion and an anti-causal portion.

20. The method of claim 13 wherein the correlation vector only includes an anti-causal portion.

21. The method of claim 13 wherein the known noise component is subtracted from the correlation vector with the main data element of the correlation vector and the middle data element of the known noise component in alignment.

22. The method of claim 21 wherein a subsequent subtraction of the known noise component from the correlation vector is performed only if the next largest data element of the correlation vector exceeds a threshold value.

23. The method of claim 21 wherein a subsequent subtraction of the known noise component from the correlation vector is performed with the next largest data element of the correlation vector in alignment with the middle data element of the known noise component.

24. The method of claim 23 wherein the subsequent subtraction of the known noise component from the correlation vector is performed only if the next largest data element of the correlation vector exceeds a threshold value.

25. The method of claim 13 wherein the subtracting of the known noise component from the correlation vector comprises iteratively subtracting the known noise component from the correlation vector.

26. A method for estimating the impulse response of a channel comprising:
a-periodically cross-correlating received data with a representation of the data as they should have been received so as to produce a correlation vector, wherein the correlation vector is characterized by a known noise component resulting from the finiteness of the correlation; and,
subtracting the known noise component from the correlation vector.

27. The method of claim 26 wherein the subtracting of the known noise component from the correlation vector comprises iteratively subtracting the known noise component from the correlation vector.

28. The method of claim 26 wherein the known noise component includes a middle data element having a substantially zero value.

29. The method of claim 28 wherein the known noise component is subtracted from the correlation vector with the zero data element of the correlation vector and the middle data element of the known noise component in alignment.

30. The method of claim 29 wherein a subsequent subtraction of the known noise component from the correlation vector is performed only if the next largest data element of the correlation vector exceeds a threshold value.

31. The method of claim 29 wherein a subsequent subtraction of the known noise component from the correlation vector is performed with the next largest data element of the correlation vector in alignment with the middle data element of the known noise component.

32. The method of claim 31 wherein the subsequent subtraction of the known noise component from the correlation vector is performed only if the next largest data element of the correlation vector exceeds a threshold value.

33. The method of claim 26 wherein the known noise component is subtracted from the correlation vector with the main data element of the correlation vector and the middle data element of the known noise component in alignment.

34. The method of claim 33 wherein a subsequent subtraction of the known noise component from the correlation vector is performed only if the next largest data element of the correlation vector exceeds a threshold value.

35. The method of claim 33 wherein a subsequent subtraction of the known noise component from the correlation vector is performed with the next largest data element of the correlation vector in alignment with the middle data element of the known noise component vector.

36. The method of claim 35 wherein the subsequent subtraction of the known noise component from the correlation vector is performed only if the next largest data element of the correlation vector exceeds a threshold value.

37. The method of claims 26 wherein the data comprises a training signal.

* * * * *